United States Patent [19]

Mui

[11] 4,244,018
[45] Jan. 6, 1981

[54] INTERLOCK CONTROL OF ASYNCHRONOUS DATA TRANSMISSION BETWEEN A HOST PROCESSOR AND A PLURALITY OF MICROPROCESSORS THROUGH A COMMON BUFFER

[75] Inventor: Wing F. Mui, Elmhurst, Ill.

[73] Assignee: GTE Automatic Electric Laboratories Incorporated, Northlake, Ill.

[21] Appl. No.: 906,167

[22] Filed: May 15, 1978

[51] Int. Cl.² .............................................. G06F 1/00
[52] U.S. Cl. ................................................ 364/200
[58] Field of Search ........................ 364/200 MS File

[56] References Cited

U.S. PATENT DOCUMENTS

| | | | |
|---|---|---|---|
| 3,214,739 | 10/1965 | Goutanis et al. | 364/200 |
| 3,566,357 | 2/1971 | Ling | 364/200 |
| 3,603,935 | 9/1971 | Moore | 364/200 |
| 3,820,084 | 6/1974 | Jones | 364/200 |
| 3,934,232 | 1/1976 | Curley et al. | 364/200 |
| 3,976,979 | 8/1976 | Parkinson et al. | 364/200 |
| 3,988,716 | 10/1976 | Fletcher et al. | 364/200 |

*Primary Examiner*—Harvey E. Springborn
*Attorney, Agent, or Firm*—Frank J. Bogacz; Robert J. Black; Charles A. Doktycz

[57] ABSTRACT

An interlock circuit is set forth which provides for controlling asynchronous data transfers between a host processor and a plurality of microprocessors via a common buffer. The interlock circuit consists of an interconnection of latches arranged so that the first processor initiating a transfer request inhibits all remaining processors from activating their respective transfer requests. Each processor upon terminating a data transfer clears its associated transfer request. The host processor can clear all transfer requests upon command.

6 Claims, 2 Drawing Figures

INTERLOCK CONTROL OF ASYNCHRONOUS DATA TRANSMISSION BETWEEN A HOST PROCESSOR AND A PLURALITY OF MICROPROCESSORS THROUGH A COMMON BUFFER

BACKGROUND OF THE INVENTION

1. Field of the Invention

The present invention relates to controlling asynchronous data transfer and more particularly to an interlock circuit and method for controlling data transfer between a host processor and a plurality of microprocessors through a common buffer.

2. Description of the Prior Art

For operation of a multi-processor system, it is necessary that a host processor communicate with each of its associated microprocessors and each microprocessor communicate with the host processor. Such communication between these processors takes the form of data transfers through a common buffer. A common buffer is utilized so that economical and efficient use of the system's resources may be made. However, in such a system each processor may simultaneously transmit data to another processor thereby, producing mixing and destruction of the data. In addition, this process is further complicated by the transmission of data words of varying length. For example, the INTEL Model 8080 microprocessor CPU is a single LSI chip of silicon gate MOS technology with a word size of 8-bits whereas, a suitable host processor (mini-computer or large-scale computer) typically has word lengths of 16 bits or more.

One such system is taught by U.S. Pat. No. 3,976,979 issued on Aug. 24, 1976, to K. L. Parkinson, et al. Shown is a host processor coupled to a single remote processor. In such a system, data is transmitted by one processor and received by the other processor. The addition and control of other remote processors is not taught by Parkinson.

Therefore, it is the object of the present invention to provide for an interlock control circuit and control method of bidirectional asynchronous data transfer between a plurality of microprocessors and a host processor. In addition, it is an objective of the present invention to provide the capability for a host processor to terminate any processor's data transfer.

It is a further objective of the invention to provide the above-mentioned features in a manner so that the number of microprocessors employed may be expanded economically and with a minimum of alterations of the interlock control circuit.

SUMMARY OF THE INVENTION

The present invention consists of an interlock circuit and method for control of asynchronous data transmission between a host processor and a plurality of microprocessors through a common buffer. The interlock circuit is connected between the control leads of the host processor and the control leads of the microprocessors. Each microprocessor and the host processor has a corresponding latch circuit which controls the access of that processor to the common buffer. Data transmission between processors takes place through a common buffer. The interlock circuit provides a control function so that more than one processor does not simultaneously access the common buffer and thereby destroy data.

In order to initiate a data transfer, a processor sends a transfer request signal to the interlock circuit. If the common buffer is idle, the latch corresponding to the requesting processor will be set. If another processor is transmitting data, the requesting processor's corresponding latch will not be set. Subsequently, the requesting processor will interrogate the corresponding acknowledge signal to determine whether its corresponding latch is set and whether only its corresponding latch is set. If the corresponding latch is the only one set, the requesting processor may initiate its data transfer through the buffer. However, if more than one processor's latch is set, this indicates that there was an error in handling the request and the requesting processor should clear its request from the active state. If the requesting processor does not find its corresponding latch set, the processor simply waits a predetermined time interval and attempts to initiate the request again.

When the requesting processor has transmitted all of the required data through the buffer, it simply initiates a clear signal in order to reset its corresponding latch. The buffer is now available to be used by the other processors.

For error conditions the host processor has the unique ability to clear all active transfer requests.

DESCRIPTION OF THE PREFERRED EMBODIMENT

Figure 1:
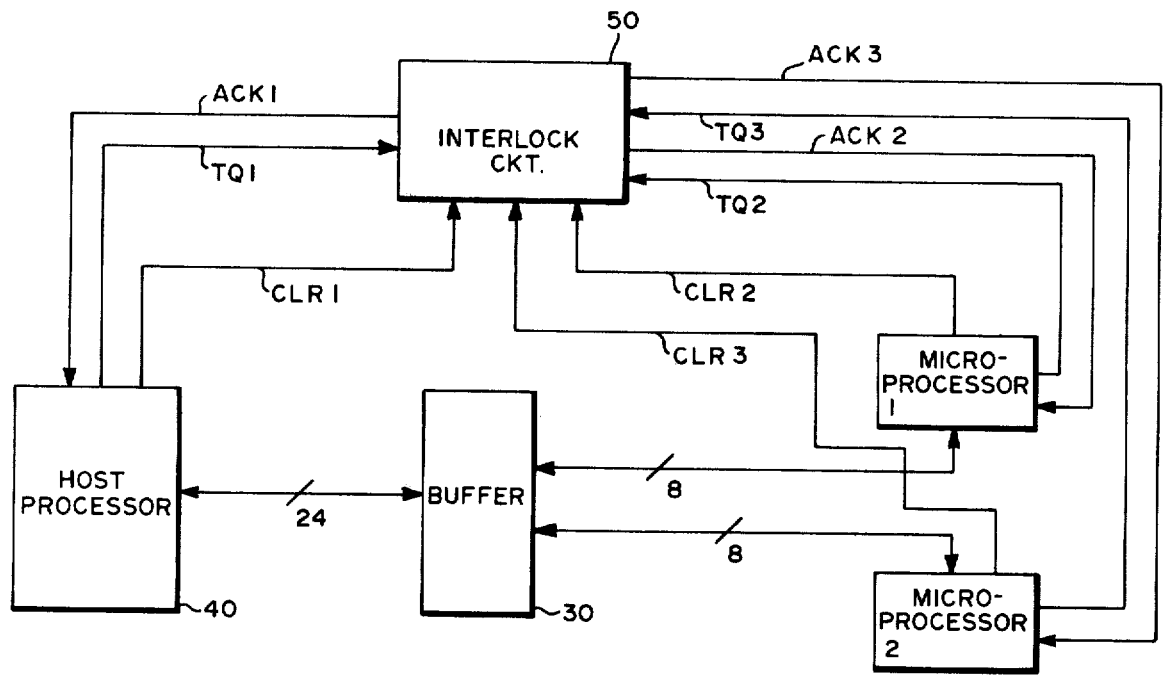
FIG. 1 is a block diagram representing the interconnections of the interlock circuit to the host processor and microprocessors.

Referring to FIG. 1, the Applicant's interlock circuit 50 is shown connected between microprocessor 1, microprocessor 2 and host processor 40. Host processor 40 comprises a computer processor register and bus arrangement as set forth in U.S. Pat. No. 3,820,084, issued to Leo V. Jones et al, on June 25, 1974. Microprocessor 1 and microprocessor 2 are connected to the host processor 40 via buffer 30, which is similar to buffer CDB-B as shown in FIG. 3 of the above referenced patent. This buffer includes a common buffer element like that discribed in the present application. Microprocessors 1 and 2 include an INTEL model 8080 microprocessor CPU. This unit is a single LSI chip employing sillcon gate MOS technolog with a word size of 8-bits. A detailed describtion of the INTEL 8080 microprocessor is set forth in *MCS-80 User's Manual*, Copyright INTEL Corporation, October, 1977.

The transfer request and acknowledge connections of the host processor 40 to the interlock circuit 50 are accomplished by the Computer Line Processor of the host processor 40 shown in FIG. 3 of the above mentioned Jones et al patent. The transfer request and acknowledge connections to the microprocessors 1 and 2 are made via the Input/Output structure as set forth in the INTEL reference cited above. Each processor is connected to the interlock circuit 50 via three connections, a transfer request (TQ) connection, an acknowledge status (ACK) connection and a clear (CLR) connection. A processor transmits data by initiating a transfer request (TQ) signal and interrogating the acknowledge status (ACK) of a corresponding latch in the interlock circuit. For example, the host processor generates a request by pulsing its TQ1 lead and thereby setting the corresponding latch in interlock circuit 50. Typically, the buffer 30 is idle and therefore, the host processor's corresponding latch is set. The host processor 40 then interrogates its corresponding latch for the presence of an acknowledge signal ACK1 to determine whether the host processor 40 has control of the buffer 30 and that host processor 40 is the only processor to have control of buffer 30. Once said control has been established the host processor may transmit its data to a particular microprocessor through buffer 30. At the completion of its data transfer, the host processor 40 pulses its clear lead CLR1. The pulsing of the CLR1 lead will reset the host processor's corresponding latch in interlock circuit 50.

If after, the host processor 40 has pulsed the transfer request lead TQ1 and it fails to receive the acknowledge signal ACK1, the above-mentioned steps are repeated at a later time. If the host processor 40 receives an indication of multiple acknowledge signals, this is an error condition and, as such, the host processor 40 will pulse the clear lead CLR1 and thereby reset all active transfer requests. For the error condition, a predetermined time interval is allowed to elapse before the above-mentioned steps are repeated.

In order for microprocessor 1 and microprocessor 2 to transmit data to the host processor 40 through buffer 30, a similar process to that mentioned above is utilized. However, microprocessors 1 and 2 have clear leads CLR2 and CLR3 respectively, which clear only a latch of interlock circuit 50 corresponding to the particular microprocessor.

Figure 2:
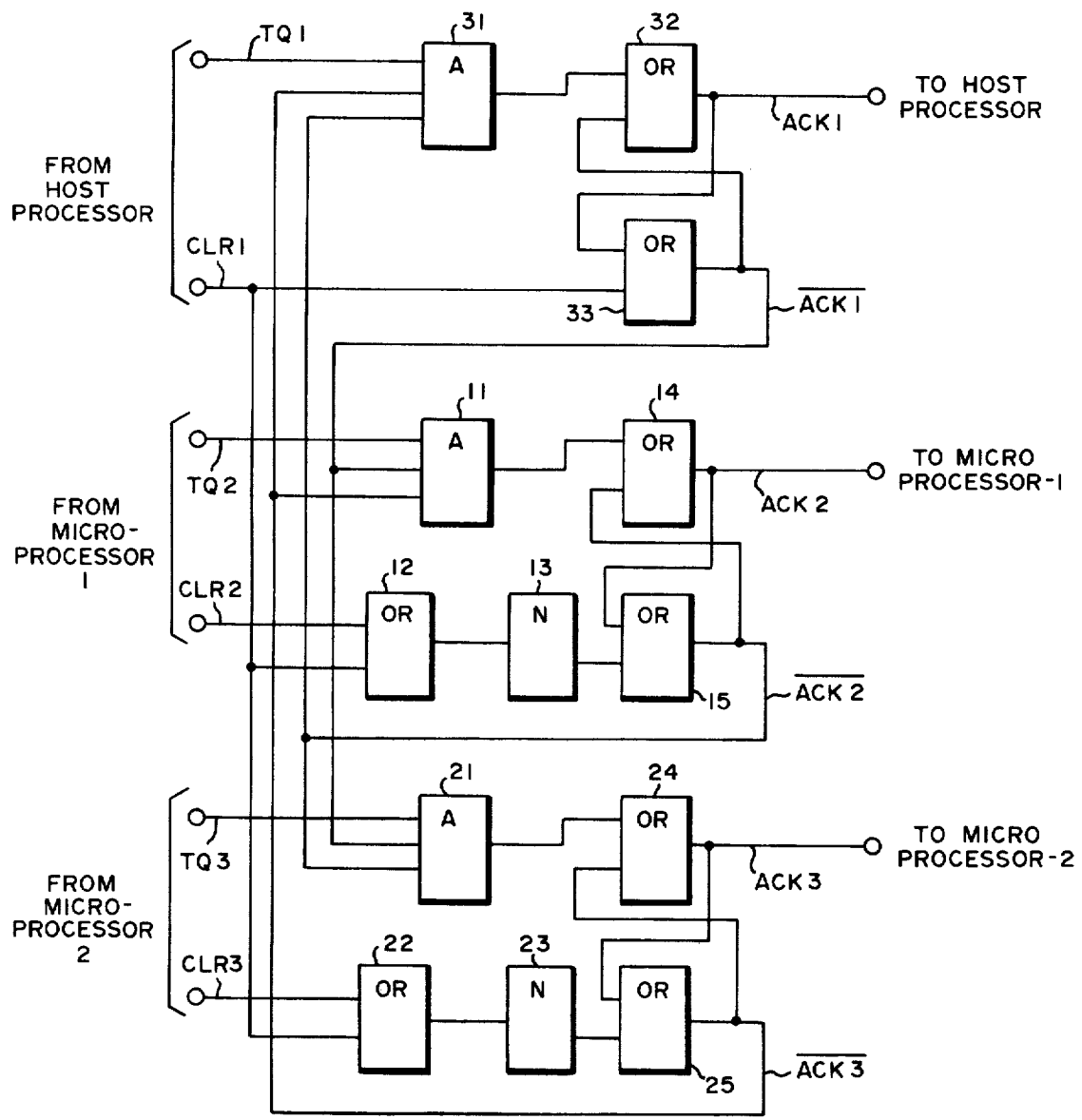
FIG. 2 is a schematic diagram of the interlock circuit of the present invention.

Next, referring to FIG. 2, it is shown that the host processor is connected to an input of AND gate 31 via the TQ1 lead and is also connected to a latch composed of OR gates 32 and 33 via the ACK1 lead. In addition to the other inputs, AND gate 31 is connected to OR gates 15 and 25 of two latches corresponding to microprocessors 1 and 2, respectively. Typically, the common buffer is in the idle state. Therefore, the signals $\overline{ACK2}$ and $\overline{ACK3}$ of OR gates 15 and 25 respectively take on the value of logic "1". Thereby, application of a pulse by the host processor to the TQ1 lead of AND gate 31 serves to operate the latch composed of OR gates 32 and 33. After the host processor has initiated its transfer request, said latch is interrogated for the signal ACK1, by the host processor to determine whether control of the common buffer has been obtained. In the event that the common buffer has been seized, signal ACK1 will be at a value of logic "1" and signal $\overline{ACK1}$ takes on the value logic "0"; and, the $\overline{ACK1}$ signal thereby inhibits AND gates 11 and 21 from responding to transfer request signals from microprocessors 1 and 2, respectively. In addition, the host processor also interrogates signals ACK2 and ACK3 to determine that the latches corresponding to microprocessors 1 and 2 have not erroneously responded to the transfer request signal TQ1 of the host processor.

At the completion of the data transfer, the host processor pulses the CLR1 lead; this pulse resets the host processor's corresponding latch composed of OR gates 32 and 33. In addition, this application by the host processor of a pulse to the CLR1 lead serves to reset the latches composed of OR gates 14–15 and 24–25 corresponding to microprocessors 1 and 2, respectively.

If the host processor does not seize the buffer (detect a value of logic "1" of signal ACK1), the host processor will simply wait a predetermined time interval and retry the above process.

Microprocessor 1 is connected to an input of AND gate 11, OR gate 12 and an output of OR gate 14 and the signals transmitted over these connections are the microprocessor 1 transfer request signal TQ2 and the microprocessor 1 clear signal CLR2 and the acknowledge signal ACK2 respectively. Operation of the circuit by microprocessor 1 is similar to that described above for the host processor. Microprocessor 1 applies a transfer request signal TQ2 to AND gate 11. In a typical state the common buffer is idle and signals $\overline{ACK1}$ and $\overline{ACK3}$ are at logic "1" thereby enabling the transfer request signal TQ2 to set its corresponding latch composed of OR gates 14 and 15. Next, microprocessor 1 interrogates said latch comporsed of OR gates 14 and 15 for the ACK2 signal to determine whether the common buffer has been seized similar to the process described above. If the buffer has been seized, microprocessor 1 may proceed to transmit data. Microprocessor 1 also interrogates signals ACK1 and ACK3 to determine whether the latches corresponding to the host processor and microprocessor 2 have erroneously responded to microprocessor 1's transfer request signal TQ2. OR gate 15 which is connected to AND gates 21 and 31, transmits a signal $\overline{ACK2}$ to these AND gates in order to inhibit their operation by the host processor and microprocessor 2. At the conclusion of data transmission microprocessor 1 pulses the CLR2 lead, thereby enabling OR gate 12 and clearing the corresponding latch composed of OR gates 14 and 15. It is to be noted that the clear signal CLR2 sent by microprocessor 1 is transmitted only to OR gate 12 and does not clear the latches associated with the host processor or microprocessor 2.

Microprocessor 2 is connected to an input of AND gate 21 and OR gate 22 and an output of OR gate 24. In order to obtain control of the buffer, microprocessor 2 initiates its transfer request signal TQ3 to set its latch composed of OR gates 24 and 25 via AND gate 21. Microprocessor 2 interrogates said latch composed of OR gates 24 and 25 for signal ACK3 to determine whether it has seized the buffer similar to the process described above for microprocessor 1. Similar to the above description of microprocessor 1, OR gate 25 is connected to an input of AND gates 11 and 31 and transmits signal $\overline{ACK3}$ in order to prevent host processor or microprocessor 1 from simultaneously seizing control of the buffer. All subsequent operations of the circuit by microprocessor 2 take place in a similar manner to those described above for microprocessor 1. Again, it is to be noted that the clear signal CLR2 of microprocessor 2 is transmitted only to OR gate 22 in order to clear the latch corresponding to microprocessor 2 and this signal has no effect on the latches corresponding to the host processor or microprocessor 1.

Furthermore, it should be noted that with the addition of a small amount of circuitry and modification to the interconnections of the present circuit, sharing of a common buffer may be extended to a number of microprocessors greater than the number shown in the preceding described configuration.

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. An interlock circuit providing for bidirectional control of asynchronous data transfer , via a common buffer element, between a host processor operable to transmit a transfer request signal and at least one of two microprocessors each operable to transmit a transfer request signal when said processors are in operation to transfer data between any two of said processors, said interlock circuit comprising:

first latching means connected to said host processor and normally operated in response to said transfer request signal transmitted from said host processor to store and acknowledge said request signal;

second latching means connected to a first microprocessor and connected to said first latching means and normally operated in response to said transfer request signal transmitted from said first microprocessor to store and acknowledge said request signal; and third latching means connected to a second microprocessor and connected to said first and to said second latching means and normally operated in response to said transfer request signal transmitted from said second microprocessor to store and acknowledge said request signal; said storage and acknowledgement of said transfer request signal from a first one of said processors to transmit its transfer request signal being effective to inhibit acceptance and acknowledgement of said transfer request signals from any other processors by inhibiting said transmission of signals acknowledging acceptance and storage of said transfer request signals of said other processors, whereby attempted simultaneous data transfer through said buffer element is controlled by said interlock circuit.

2. An interlock circuit as claimed in claim 1, wherein: said first latching means includes enabling means connected to said host processor and normally operated in response to said transfer request signal; and said first latching means further includes a first latch connected to said enabling means and to said host processor wherein said first latch is operated in response to said operation of said enabling means to store said host processor's transfer request signal and to acknowledge to said host processor the storage of said transfer request signal.

3. An interlock circuit as claimed in claim 2, wherein: said second latching means includes enabling means connected to said first microprocessor and to said first latch and normally operated in response to said transfer request signal of said first microprocessor and in the absence of a latched transfer request signal in the first latch; and said second latching means further includes a second latch connected to said enabling means, to said first microprocessor and to said enabling means of said first latching means wherein said second latch is operated in response to said operation of said enabling means to store said first microprocessor's transfer request signal, to acknowledge to said first microprocessor the storage of the transfer request in said second latch, and to inhibit the acceptance of the transfer request signal by said first latching means when said first microprocessor is the first one to operate.

4. An interlock circuit as claimed in claim 3, wherein: said second latching means further includes combining means connected to said second latch, to said host processor and to said first microprocessor, wherein said combining means is operated in response to clear signals of said host processor and said first microprocessor whereby said transfer request signal of said first microprocessor is cleared from its said stored state by resetting said second latch.

5. An interlock circuit as claimed in claim 3, wherein: said third latching means includes enabling means connected to said second microprocessor and to said first and second latches and operated in response to said transfer request signal of said second microprocessor and in the absence of a latched transfer request signal in the first and second latches; and said third latching means further includes a third latch connected to said enabling means of said third latching means and to said second microprocessor and to said enabling means of said first and said second latching means, and said third latch operated in response to said operation of said enabling means to store said second microprocessor's transfer request signal to acknowledge to said second microprocessor the storage of the transfer request in the third latch, and to inhibit the acceptance of the transfer request signal by the first and second latching means when said second processor is the first one to operate.

6. An interlock circuit as claimed in claim 5, wherein: said third latching means further includes combined means connected to said third latch, to said host processor and to said second microprocessor, wherein said combining means is operated in response to clear signals of said host processor and said second microprocessor whereby said transfer request signal of said second microprocessor is cleared from its said stored state by resetting said third latch.

* * * * *